United States Patent [19]

Allard et al.

[11] Patent Number: 4,918,833

[45] Date of Patent: Apr. 24, 1990

[54] METHOD OF ASSEMBLING AN ELECTRONIC TRANSDUCER

[75] Inventors: John J. Allard, Morrison; Merle L. Kemp, Prophetstown; Alan J. Janicek, Morrison, all of Ill.

[73] Assignee: General Electric Company, Fort Wayne, Ind.

[21] Appl. No.: 179,202

[22] Filed: Apr. 8, 1988

[51] Int. Cl.[5] .......................... G01L 7/08; G01L 9/04

[52] U.S. Cl. .................................... 29/621.1; 29/595; 29/1; 73/726; 73/756; 338/4

[58] Field of Search .................... 29/621.1, 610.1, 595; 73/726, 727, 720, 721, 756, 431; 338/4

[56] References Cited

U.S. PATENT DOCUMENTS

| | | | |
|---|---|---|---|
| 3,247,719 | 4/1966 | Chelner | 73/726 |
| 3,389,362 | 6/1968 | McLellan | 73/720 |
| 3,520,191 | 7/1970 | Pien | 73/726 |
| 3,935,636 | 2/1976 | Mermelstein | 29/619 |
| 4,217,783 | 8/1980 | Ito et al. | 73/726 |
| 4,414,851 | 11/1983 | Maglic | 73/706 |
| 4,776,219 | 10/1988 | Friedrich | 73/726 |
| 4,796,464 | 1/1989 | Miller | 73/115 |
| 4,797,007 | 1/1989 | Elmore, III | 374/143 |

FOREIGN PATENT DOCUMENTS

| | | |
|---|---|---|
| 0292606 | 11/1988 | European Pat. Off. . |
| 3303980 | 9/1984 | Fed. Rep. of Germany . |
| 3601249 | 7/1987 | Fed. Rep. of Germany . |
| 3703983 | 8/1988 | Fed. Rep. of Germany . |
| 2064778 | 6/1981 | United Kingdom . |

OTHER PUBLICATIONS

"Strain Gage Pressure Transducer Refresher", by Bernard H. Shapiro, published in Oct. 1984 issue of *The Industrial Process Control Magazine.*

Brochure TN-510 entitled "Design Considerations for Diaphragm Pressure Transducers" of Measurements Group, Inc., Raleigh, N.C.

*Primary Examiner*—Donald O. Woodiel
*Attorney, Agent, or Firm*—Ralph E. Krisher, Jr.

[57] ABSTRACT

A method of assembling an electronic transducer having a dielectric casing member, a strain gauge, a metallic casing member including at least one wall in part defining an integral flexible diaphragm, and an electronic device including a plurality of solid state components. In this method, the strain gauge is bonded to the at least one wall spanning across the diaphragm so as to be at least in part conjointly flexible with the diaphragm. The electronic device is disposed in superposed spaced apart relation and in circuit relation with the strain gauge, and the strain gauge and the electronic device are enclosed between the dielectric casing member and the metallic casing member.

25 Claims, 7 Drawing Sheets

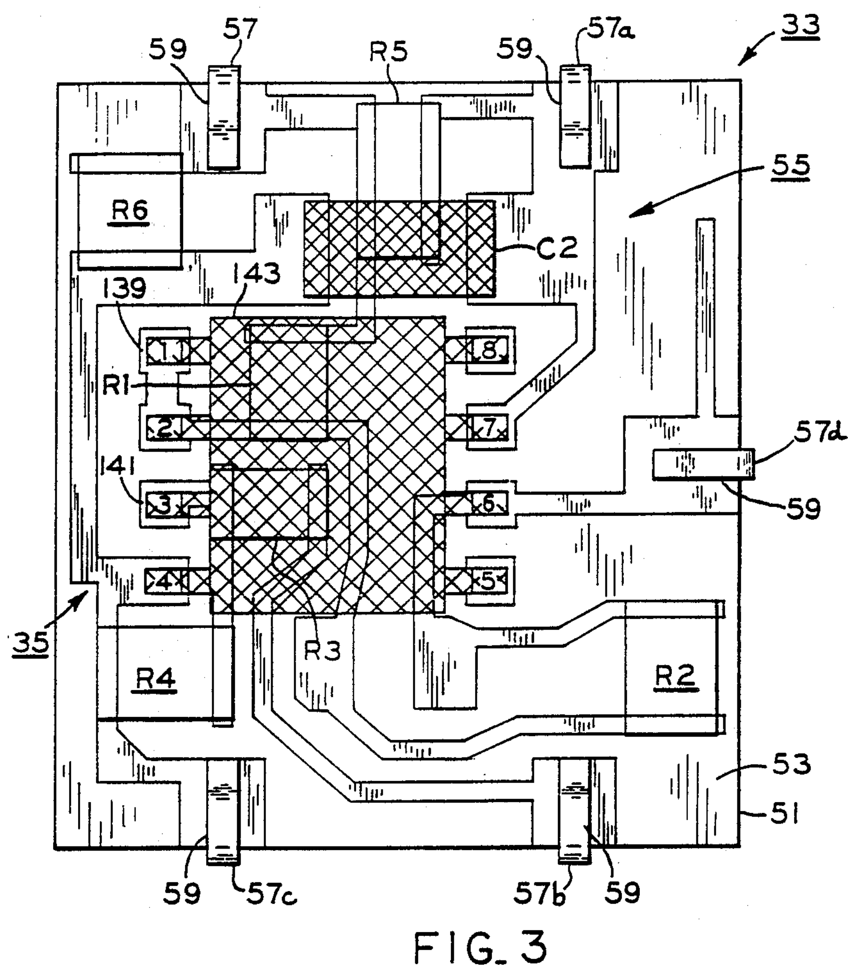
FIG_3
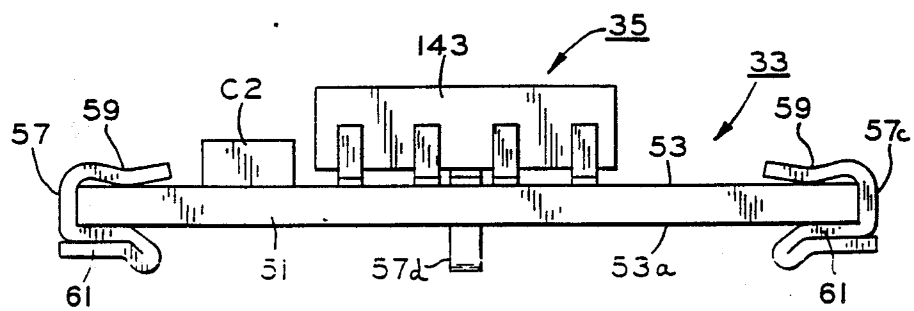
FIG_4

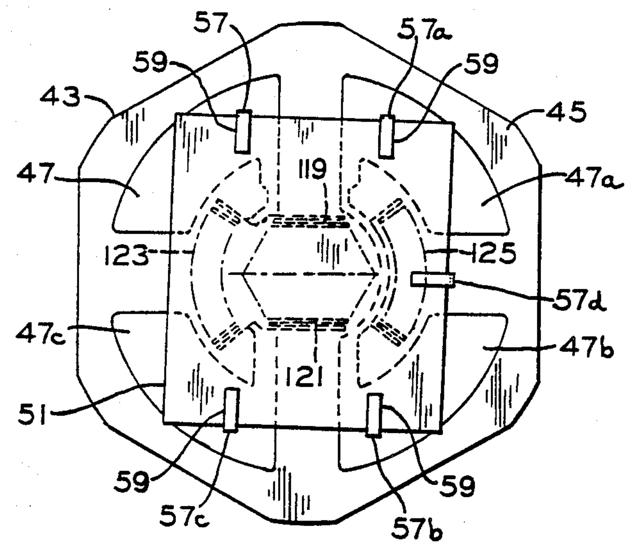
FIG_5
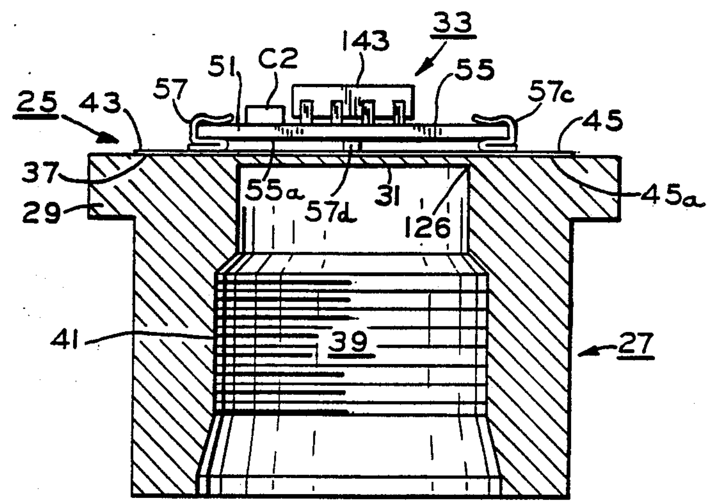
FIG_6

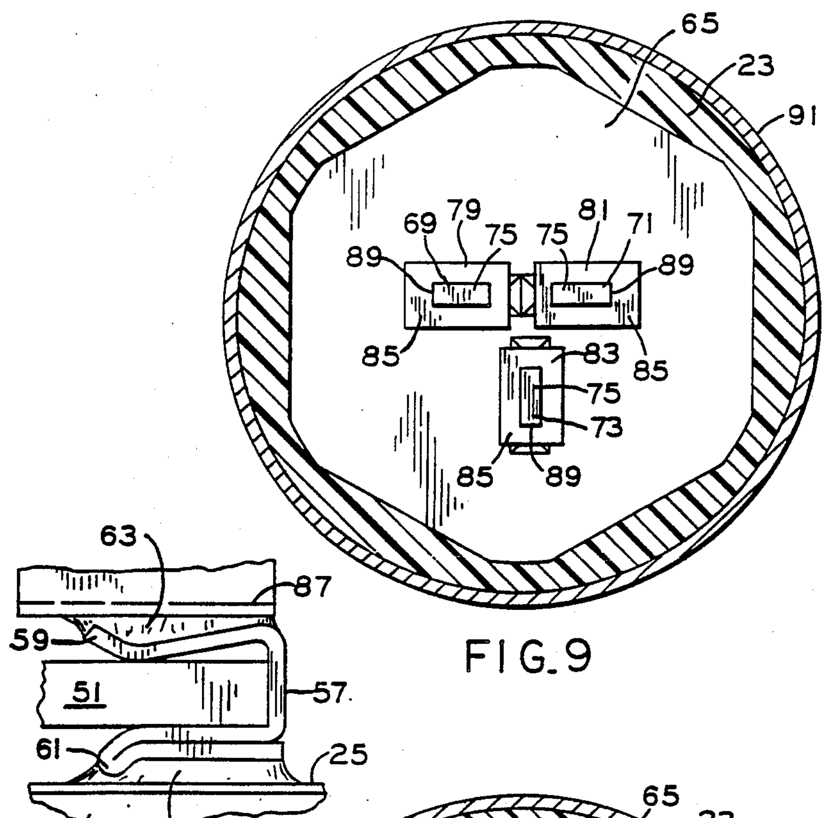
FIG.9
FIG8
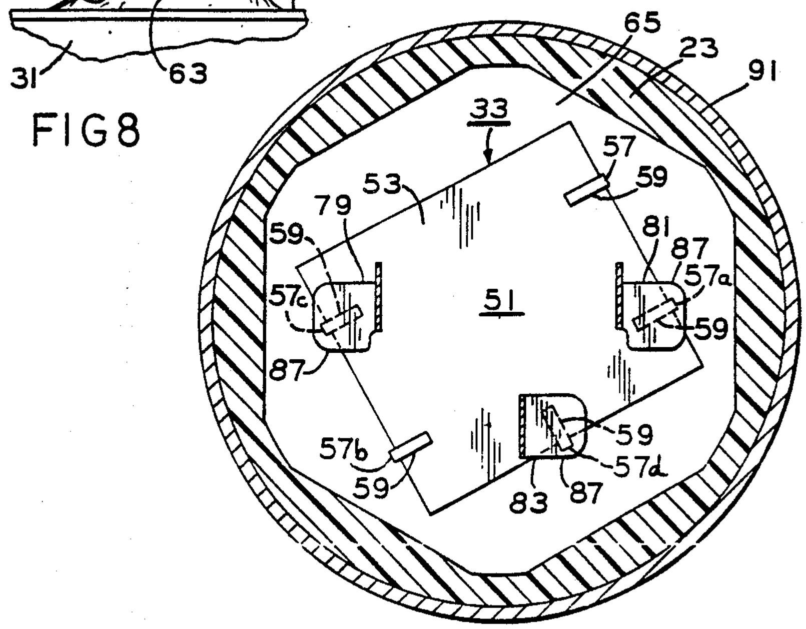
FIG.10

METHOD OF ASSEMBLING AN ELECTRONIC TRANSDUCER

FIELD OF THE INVENTION

This invention relates in general to electronic apparatus and in particular to a method of assembling an electronic transducer adapted for establishing an output voltage proportional to a fluid pressure supplied thereto.

BACKGROUND OF THE INVENTION

In the past, many different types of transducers were employed in various applications to establish an output voltage which was proportional to a sensed fluid pressure or a fluid pressure supplied to such transducers for effecting the operation thereof. One of the aforementioned applications was an automotive air conditioning system in which one of the past transducers was employed to control many of the functions of some of the components of such system. One of the disadvantageous or undesirable features of some of the aforementioned past transducers is believed to be that the size thereof was too large. For instance, due to the aforementioned large size of some of the past transducers, it is believed that it may have been necessary to mount such transducers in the plumbing of the automotive air conditioning system, and it is also believed that such plumbing mounting of such transducers may have resulted in increased labor and/or cost. Thus, it would be desirable to provide a transducer which may be coupled to a compressor or other component of an automotive air conditioning system or that may replace an existing device, such as a high pressure cut-out switch or the like for instance, currently mounted to such compressor with such transducer performing the functions of such existing device as well as other functions.

SUMMARY OF THE INVENTION

Among the several objects of the present invention may be noted the provision of an improved method of assembling an electronic transducer which overcomes the above discussed disadvantageous or undesirable features, as well as others, of the prior art; the provision of such improved method in which a strain gauge is provided on a wall of a casing member having an integral flexible diaphragm so that the diaphragm and at least a part of the strain gauge may be conjointly flexed or deflected the strain gauge being adapted to generate an electrical signal indicative of its deflection when the diaphragm is subjected to a fluid pressure; the provision of such improved method in which an electronic device having a plurality of solid state components connected in circuit relation thereon is mounted in a preselected position and in circuit relation with the strain gauge the electronic device being adapted to receive the electrical signal from the strain gauge and electronically amplify the electrical signal; the provision of such improved method in which a set of conductive mounting means are interconnected in the circuit relation with at least one of the strain gauge and the electronic device and maintain the preselected position of the electronic device; the provision of such improved method in which a set of contact blades are connected in circuit relation with a supporting section on each terminal of a set of such terminals for the electronic transducer so as to extend in preselected located positions from the supporting sections; the provision of such improved method in which the contact blades are interconnected with respective ones of the conductive mounting means' and the supporting sections of the terminals; the provision of such improved method in which the electronic transducer has a pair of casing members arranged in a preselected assembly position to facilitate the interconnection of the contact blades with the respective ones of the conductive mounting means; the provision of such improved method in which the strain gauge is formed in place directly on the wall of the casing member; the provision of such improved method in which the strain gauge includes a flexible carrier adhered to the wall of the casing member; the provision of such improved method in which the strain gauge at least has a set of resistance elements arranged in preselected arrays thereof and located at least in part on the diaphragm so as to be conjointly flexible therewith; and the provision of such improved method in which the component parts of the electronic transducer utilized in the practice of such improved method are compact in size, rugged in construction, economical to manufacture, easily assembled, and reliable, sensitive and accurate in operation. These as well as other objects and advantageous features of the present invention will be in part apparent and in part pointed out hereinafter.

In general, a method is provided in one form of the invention for assembling an electronic transducer. The electronic transducer has a dielectric casing member, a strain gauge, a metallic casing member including at least one wall means defining an integral flexible diaphragm, and an electronic device including a plurality of solid state components associated in circuit relation. In practicing this method, the strain gauge is provided on the at least one wall means of the metallic casing member spanning with the strain gauge the diaphragm so as to be at least in part conjointly flexible at least in part across the diaphragm. The electronic device is disposed in superposed spaced apart relation and in circuit relation with the strain gauge and at least the strain gauge and the electronic device are enclosed between the metallic casing member and the dielectric casing member.

Further in general and in one form of the invention, a method is provided for assembling an electronic transducer having an electronic device, a strain gauge, a dielectric casing member including a set of terminals each with a supporting section and an electrical connector section, a metallic casing member including at least one wall means for defining an integral flexible resilient diaphragm, and a set of contact blades each including a pair of end portions. In practicing this method, one of the end portions on the contact blades are supported on the supporting sections of the terminals in circuit making engagement, respectively. The strain gauge is associated with the at least one wall of the metallic casing member so as to at least in part span across the diaphragm, and the electronic device is disposed in superposed spaced apart relation and in circuit relation with the strain gauge. The other of the end portions of on the contact blades are connected in circuit relation with at least the electronic device, and the dielectric casing member and the metallic casing member are engaged in an assembly position thereby to enclose at least the strain gauge, the electronic device, the contact blades and the supporting sections of the terminals between the dielectric casing member and the metallic casing member in the assembly position thereof.

BRIEF DESCRIPTION OF THE DRAWINGS

FIG. 3 is an enlarged plan view of an electronic device shown in FIG. 1 and having a plurality of solid state components connected in circuit relation in the electronic device and also having a set of conductive mounting means connected in circuit relation to the electronic device;

FIG. 4 is a side elevational view of the electronic device shown in FIG. 3;

FIG. 5 is a plan view showing the electronic device in outline form mounted in superposed spaced apart relation and in circuit relation by the conductive mounting means to the strain gauge which is bonded to a wall of a metallic casing member shown in FIG. 1;

FIG. 6 is a partial sectional view taken along line 6—6 in FIG. 5;

FIG. 8 is an enlarged fragmentary view taken from FIG. 7 and illustrating in greater detail the interconnection of one mounting means with the electronic device and the strain gauge and also with one contact blade;

FIG. 9 is a sectional view taken along line 9—9 in FIG. 7;

FIG. 10 is a sectional view taken along line 10—10 in FIG. 7;

Corresponding reference characters indicate corresponding parts throughout the several views of the drawings.

The exemplifications set out herein illustrate the preferred embodiment of the present invention in one form thereof, and such exemplifications are not to be construed in any manner as limiting either the scope of this disclosure or the scope of the present invention.

DETAILED DESCRIPTION OF THE PREFERRED EMBODIMENT

Figure 7:
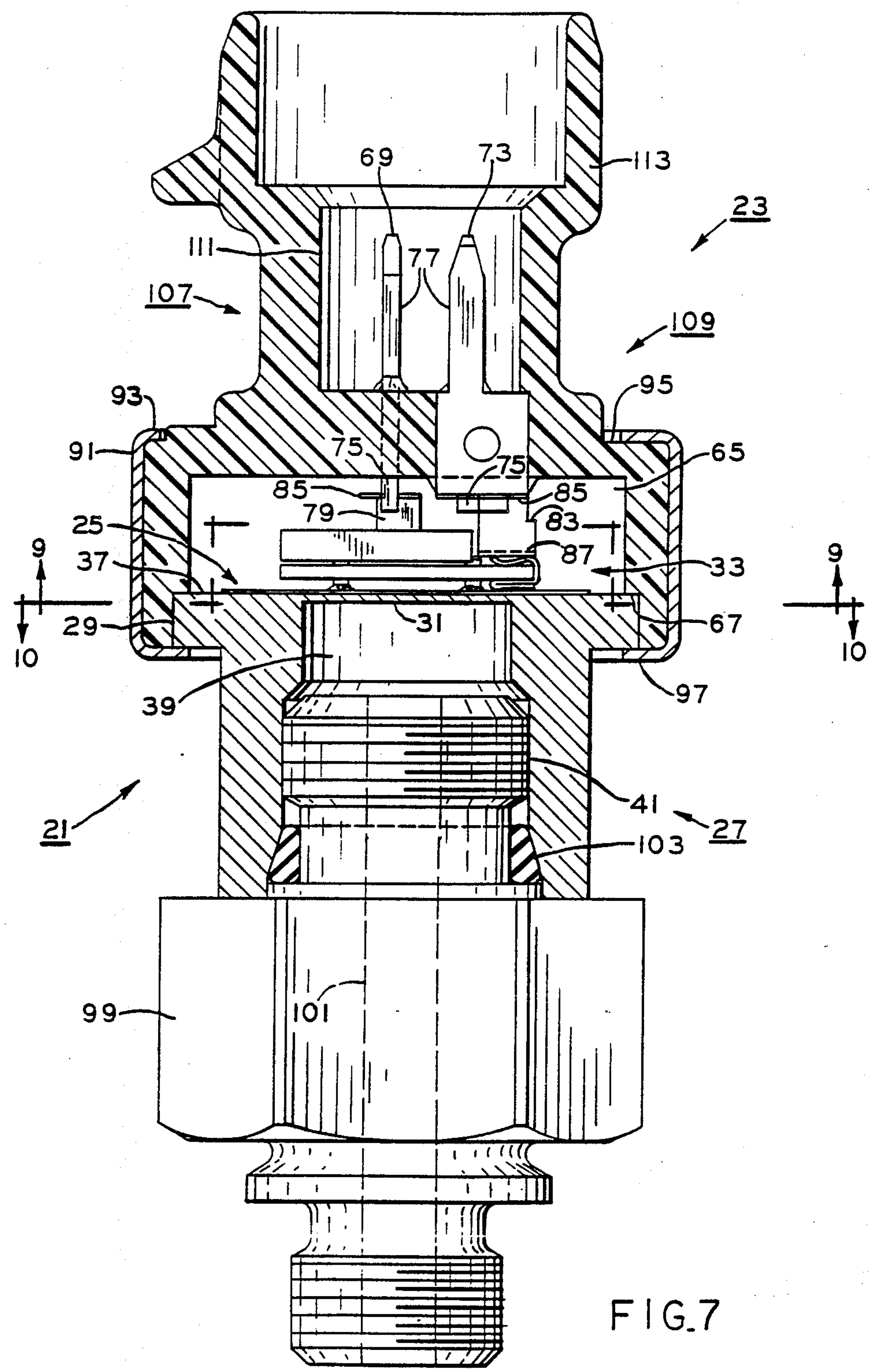
FIG. 7 is a sectional view showing the electronic transducer in cross-section.

With reference now to the drawings in general, there is illustrated a method in one form of the invention for assembling an electronic transducer 21 (FIGS. 1-11). Transducer 21 is provided with a dielectric casing member 23, a strain gauge or strain gauge means 25, a metallic casing member 27 including at least one end wall or end wall means 29 for defining an integral flexible resilient diaphragm or diaphragm means 31, and an electronic device, such as for instance an electronic chip or a thick film network 33 or the like, including a plurality of solid state components 35 mounted in circuit relation thereon (FIGS. 1-7). In practicing this assembling method, strain gauge 25 is associated by suitable means well known to the art, such as bonding or the like for instance (not shown), with end wall 29 of metallic casing member 27, and the strain gauge spans diaphragm 31 so as to be at least in part conjointly flexed with the diaphragm (FIGS. 5 and 6). Electronic device 33 is disposed in superposed spaced apart relation with strain gauge 25, and the electronic device and the strain gauge are enclosed between dielectric casing member 23 and metallic casing member 27 (FIG. 7).

Figure 1:
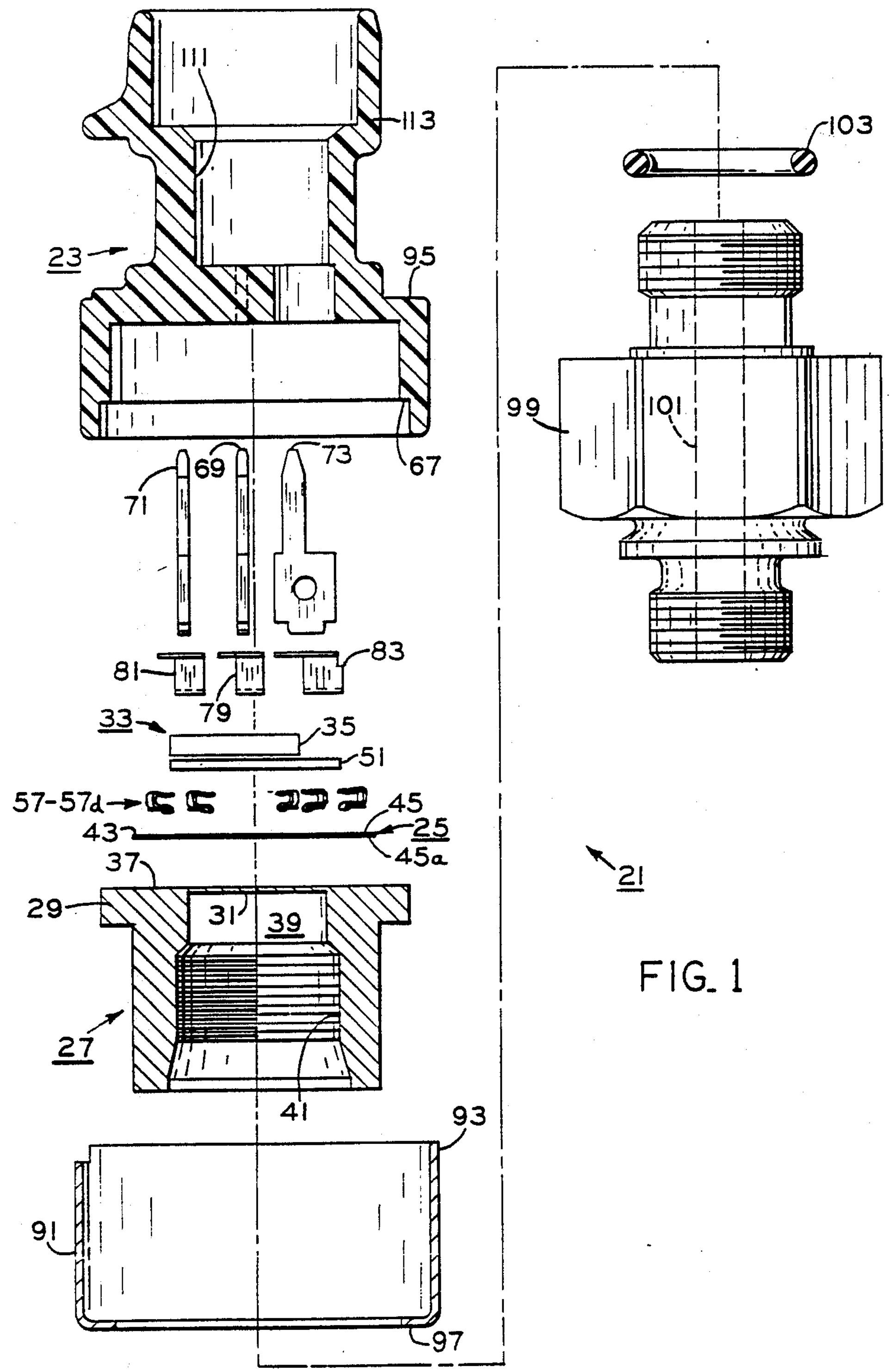
FIG. 1 is a partial sectional, exploded view showing an electronic transducer and illustrating principles which may be practiced in a method of assembling an electronic transducer in one form of the invention.

More particularly and with specific reference to FIGS. 1, 5 and 6, metallic casing member 27 may be formed of a metal having the desired physical characteristics, such as for instance a stainless steel or the like. End wall 29 of metallic casing member 27 has a free end face 37, and a generally disc shaped section forming diaphragm 31 is integrally provided in the end wall between the end face and a recess or recess means defining a chamber 39 in the metallic casing member having an open end or end portion threaded at 41.

Figure 2:
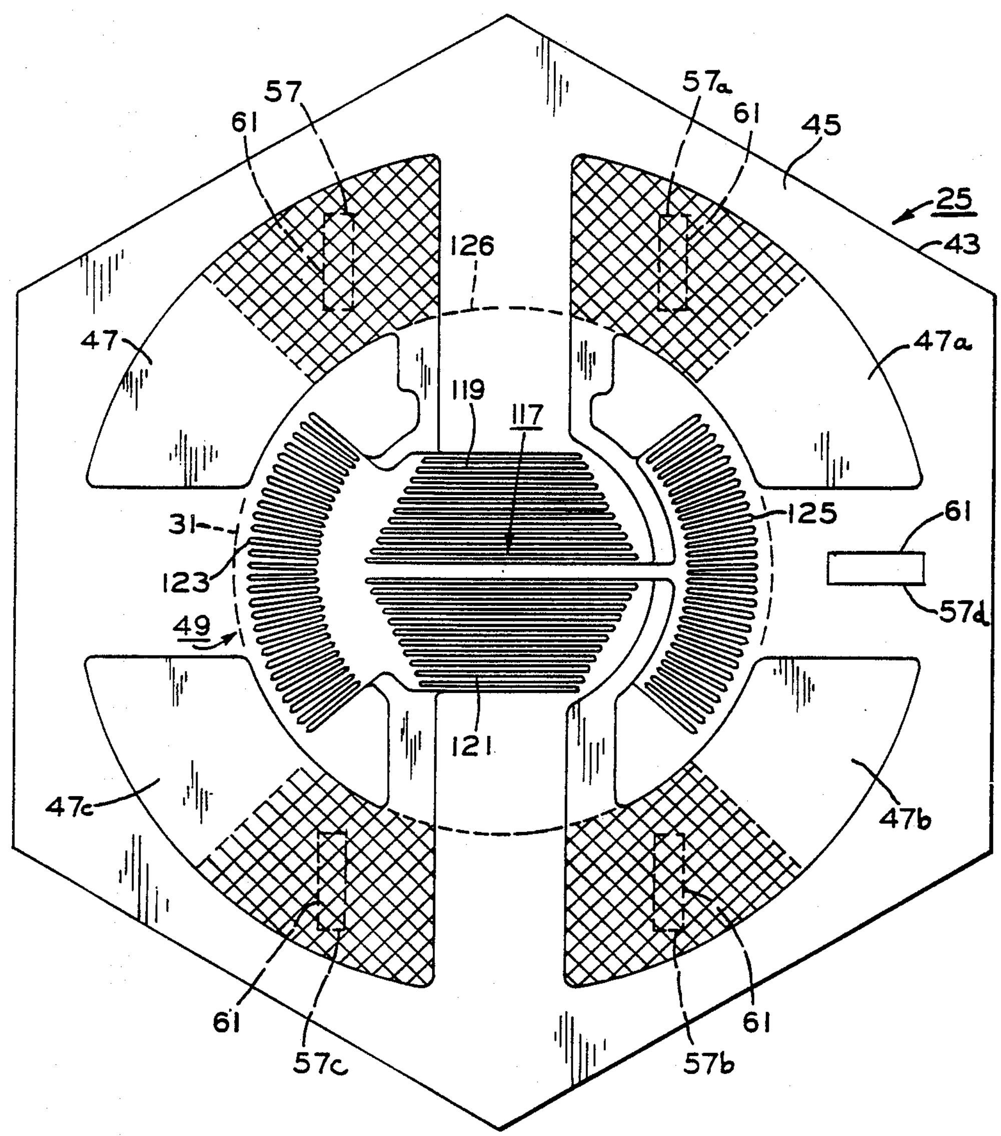
FIG. 2 is an enlarged plan view of a strain gauge shown in FIG. 1.

Strain gauge 25 is provided with a generally thin flexible, resilient, insulating backing material, such as for instance a carrier, carrier means or matrix 43 or the like, having a pair of generally opposite sides or faces 45, **45*a*, and the carrier may be formed of any suitable dielectric material, such as for instance a glass fiber filled resin or a resin material available commercially under the trade designation "Kapton" from DuPont de Nemours of Wilmington, Del. As best seen in FIGS. 1, 2 and 6, opposite side 45*a* of carrier 43 is associated, bonded or otherwise adhered in displacement preventing engagement to end face 37 of metallic casing member 27 by suitable adhering means, such as for instance a thermosetting epoxy or the like (not shown). Thus, when heated, the thermosetting epoxy bonds carrier 43 to end face 37 of metallic casing member 27. A plurality or set of connection pads 47, 47*a*, 47*b*, 47*c* and resistance means 49 are provided in a predetermined pattern or array on opposite side 45 of carrier 43, and the resistance means span in part across diaphragm 31 of metallic casing member 27** so as to be conjointly flexed or deflected with the diaphragm, as discussed in greater detail hereinafter.

Electronic device 33 is provided with a substrate 51 having a pair of generally opposite sides or faces 53, **53*a*, and the substrate may be formed of a suitable material having the desired electrical and physical characteristics, such as for instance a ceramic material or a dielectric material or the like, as best seen in FIGS. 3 and 4. A printed or etched circuit or circuitry 55 on opposite side 53 of substrate 51 is provided to interconnect solid state components 35 in circuit relation with each other at least adjacent opposite side 53, as discussed in greater detail hereinafter, and a set of resilient conductive mounting means, such as spring or electrical connector clips 57, 57*a*, 57*b*, 57*c*, 57*d* or the like, are releasably secured in preselected locations to substrate 51 so as to extend generally about an edge thereof. Spring clips 57–57*d* have a generally U-shaped configuration and may be formed of any suitable material having the desired electrical and physical properties, such as for instance a phosphorus bronze alloy or the like. When disposed in their preselected locations on electronic device 33, each spring clip 57–57*d* has one contact arm 59 thereof biased into gripping and circuit making engagement with a respective part of circuit 55 on opposite side 53 of substrate 51 and also has another or opposite folded over arm 61 biased into gripping engagement with opposite side 53*a* of the substrate. Of course, spring clips 57–57*d* may be mounted in their preselected positions to electronic device 33 either before, after or generally simultaneously with the previously discussed association of strain gauge 25 with metallic casing member 27**. Further, while the particular configuration of spring clips 57–57*d* and their mounting and circuit making association with electronic device 33 are illustrated herein for purposes of disclosure it is contemplated that various other conductive mounting means having different configurations and associated in different manners with the electronic device may be utilized within the scope of the invention so as to meet at least some of the objects thereof.

Subsequent to the assembly of spring clips 57–57*d* with electronic device 33 as described above, opposite side 53*a* on substrate 51 of the electronic device is disposed in superposed spaced apart relation with opposite side 45 on carrier 43 of strain gauge 25 which is, as previously mentioned, bonded to end face 37 of metallic casing member 27, and contact arms 61 of the spring clips are arranged in preselected locations on the strain gauge, as best seen in FIGS. 5 and 6. With spring clips 57–57*d* arranged in the aforementioned preselected locations thereof on strain gauge 25, it may be noted that contact arms 61 of the spring clips 57–57*c* are respectively disposed in circuit relation or circuit making engagement with contact pads 47–47*c* of strain gauge 25 when electronic device 33 is arranged in superposed relation with the strain gauge, and contact arm 61 of spring clip 57*d* is disposed in a position seated against carrier 43 of the strain gauge in spaced apart relation between connection pads 47*b*, 47*c* thereof so as to be electrically disassociated from pads 47*b*, 47*c*. In order to secure contact arms 61 of spring clips 57–57*d* in the above discussed positions thereof on strain gauge 25, a suitable conductive adhering material, such as for instance a conductive thermosetting epoxy or a soldering paste 63 or the like, is applied to contact arms 61 of spring clips 57–57*d* and/or contact pads 47–47*c* of carrier 43 and, when heated, soldering paste 63 solidifies thereby to interconnect contact arms 61 of spring clips 57–57*c* in circuit relation with contact pads 47–47*c* on strain gauge 25 while interconnecting contact arm 61 of spring clip 57*d* only in mounting or supporting relation on carrier 43 of the strain gauge, as illustrated in FIG. 8. While contact arms 61 of spring clips 57–57*d* are each secured to strain gauge 25, as discussed above, only the securement between spring clip 57*a* and the strain gauge is illustrated in detail in FIG. 8 for purposes of drawing simplification. Further, while strain gauge 25 and electronic device 33 are illustrated herein as being interconnected and mounted together by spring clips 57–57*d* for purposes of disclosure, it is contemplated that various different suitable means, such as for instance conductive stand-offs or electrical leads or the like, for interconnecting and mounting the strain gauge and electronic device may be utilized within the scope of the invention so as to meet at least some of the objects thereof. Additionally, while the solidification of soldering paste 63 has been disclosed herein as interconnecting contact arms 61 of spring clips 57–57*c* and connection pads 47–47*c* of strain gauge 25 in circuit relation, it is believed that such contact arms and connection pads may be connected together by various other means, such as for instance a resilient connection or the like, within the scope of the invention so as to meet at least some of the objects thereof. Thus, when electronic device 33 is mounted in the superposed spaced apart relation thereof with strain gauge 25, it may be noted that solid state components 35 on opposite side 53 of substrate 51 are remotely located from opposite side 45 of strain gauge carrier 43.

Figure 11:
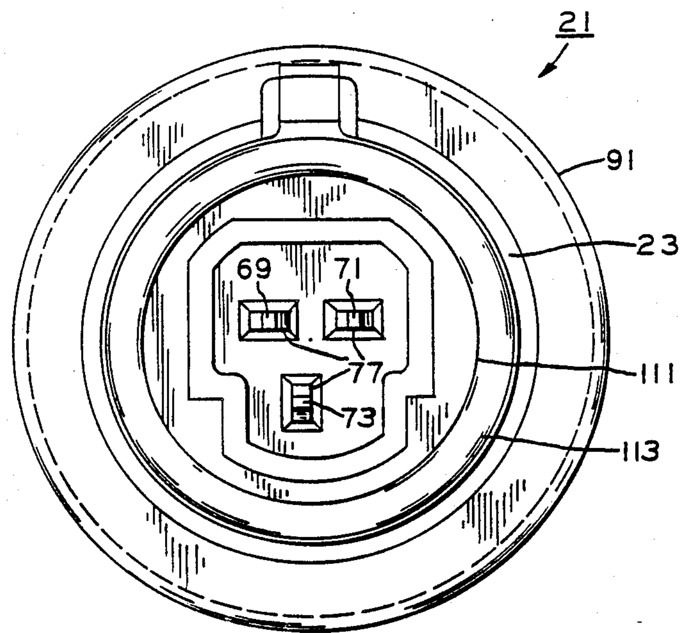
FIG. 11 is a top elevational view of the electronic transducer shown in FIG. 7.

Dielectric casing member 23 is provided with an open ended chamber 65 therein defined by a stepped recess or recess means with a generally annular shoulder 67 between the stepped recesses, as best seen in FIGS. 7, 9 and 10. A set of terminals or terminal means, such as for instance input terminals 69, 71 and output terminal 73 or the like, are molded in place in dielectric casing member 23, and each terminal has a supporting section 75 disposed within chamber 65 and an electrical connection section 77 extending exteriorly of the dielectric casing member, as best seen in FIGS. 7, 9 and 11. While terminals 69, 71, 73 are illustrated herein as being molded in situ with dielectric casing member 23, it is contemplated that different terminals may be mounted in openings provided therefor in another dielectric casing member by suitable means, such as for instance staking or the like, as well known to the art within the scope of the invention so as to meet at least some of the objects thereof.

A set of contact blades or connection means 79, 81, 83 each have a pair of deformed ends or end portions 85, 87 with end portion 85 having an opening 89 therein. Either before, after or generally simultaneously with any one of the method steps discussed hereinabove with respect to the assembling of transducer 21, openings 89 in end portions 85 of contact blades 79, 81, 83 may be placed about supporting sections 75 of terminals 69, 71, 73 so as to assemble or position the contact blades and terminals in circuit relation and in displacement preventing engagement. Albeit, not shown for purposes of drawing simplification, contact blades 79, 81, 83 at end portion 85 adjacent opening 89 may be staked or otherwise deformed into displacement preventing engagement with supporting sections 75 on terminals 69, 71, 73, respectively; however, it is contemplated that the contact blades and terminals may be interconnected in displacement preventing engagement by other suitable means, such as for instance swedging, clinching or soldering or the like, within the scope of the invention so as to meet at least some of the objects thereof. Thus, it may be noted that when end portions 85 of contact blades 79, 81, 83 are connected in circuit relation and in displacement preventing engagement with terminals 69, 71, 73, the contact blades are disposed in preselected located positions within chamber 65 of dielectric casing member 23, and free end portions 87 on the contact blades extend or are disposed in preselected locations.

Subsequent to the interconnection of contact blades 79, 81, 83 and terminals 69, 71, 73, as discussed above, the aforementioned conductive adhering material, such as thermosetting epoxy or soldering paste 63 is applied onto free end portions 87 of the contact blades and/or onto contact arms 59 of spring clips 57*a*, 57*c*, 57*d* in the mounting engagement thereof between strain gauge 25 and electronic device 33 on metallic casing member 27. Thereafter, dielectric casing member 23 and metallic casing member 27 are associated or assembled together in a preselected assembly position with respect to each other. Since free end portions 87 of contact blades 79, 81, 83 are disposed in preselected locations within chamber 65 of dielectric casing member 23, as previously discussed, the free end portions are predeterminately disposed at least adjacent contact arms 59 of spring clips 57*a*, 57*c*, 57*d* with soldering paste 63 being interposed therebetween upon the association dielectric casing member 23 and metallic casing member 27 in their preselected assembly position; and when heated, the soldering paste solidifies thereby to interconnect the free end portions in circuit relation and displacement preventing engagement with contact arms 59 of spring clips 57*a*, 57*c*, 57*d*, as best seen in FIGS. 8 and 10. While free end portions 87 of contact blades 79, 81, 83 are secured in circuit relation to contact arms 59 of spring clips 57*a*, 57*c*, 57*d* by solidified soldering paste 63, as discussed above, only the securement between spring clip 57*d* and contact blade 83 is illustrated in detail in FIG. 8 for the purpose of drawing simplification. Furthermore, while the solidification of soldering paste 63 in circuit making engagement between free end portions 87 of contact blades 79, 81, 83 and contact arms 59 of spring clips 57*a*, 57*c*, 57*d* is illustrated herein for purposes of disclosure, it is contemplated that the contact blades and spring clips may be interconnected in circuit relation and in displacement preventing engagement by other suitable means, such as for instance clinching, swedging or staking or the like, within the scope of the invention so as to meet at least some of the objects thereof. Additionally, while contact blades 79, 81, 83 are disclosed herein as being connected between terminals 69, 71, 73 and spring clips 57*a*, 57*c*, 57*d*, for purposes of disclosure, it is contemplated that other suitable means, such as for instance electrical leads or the like, may be connected between the terminals and spring clips within the scope of the invention so as to meet at least some of the objects thereof.

Upon the disposition of dielectric casing member 23 and metallic casing member 27 in their preselected assembly position, end wall 29 on the metallic casing member is received in seating or abutting engagement against annular shoulder 67 on the dielectric casing member within chamber 65 thereby to close the chamber; therefore, it may be noted that strain gauge 25, electronic device 33, spring clips 57–57*d* between the strain gauge and electronic device 33, and contact blades 79, 81, 83 between spring clip 57*a*, 57*c*, 57*d* and supporting sections 75 of terminals 69, 71, 73 are all enclosed within chamber 65, as best seen in FIGS. 7, 9 and 10. Thereafter, a generally tubular sleeve or collar 91 is disposed in assembly relation about a part of dielectric casing member 23, and a generally radially inwardly extending flange 93 integral with the collar at an end thereof is placed in abutment with a cooperating external shoulder 95 provided therefor on the dielectric casing member. Collar 91 is deformed in part to provide thereon another generally radially inwardly extending integral flange 97 which extends into abutment with a part of metallic casing member 27 thereby to retain end wall 29 on the metallic casing member in seating engagement with annular shoulder 67 on the dielectric casing member and to retain the dielectric and metallic casing members against displacement from the preselected assembly position thereof. While collar 91 is illustrated herein as retaining dielectric and metallic casing members 23, 27 against displacement, it is contemplated that other suitable means, such as for instance an adhesive material, riveting or bolting or the like, may be utilized within the scope of the invention for retaining the dielectric and metallic casing members against displacement.

A threaded fitting 99 having a pressure fluid passage or passage means 101 therethrough may be threadedly received in threaded open end 41 of chamber 39 with the pressure fluid passage communicating with the chamber, and suitable sealing means, such as for instance, an O-ring seal 103 or the like, is disposed in sealing engagement between the fitting and metallic casing member 27. Fitting 99 and O-ring seal 103 may be associated with metallic casing member 27 either before or after the previously discussed bonding of strain gauge 25 thereto. Of course, pressure fluid passage 101 of fitting 99 is adapted to be connected in pressure fluid communication with a fluid pressure source (not shown) thereby to subject chamber 39 in metallic casing member 27 to fluid pressure, as further discussed hereinafter. To complete the description of the foregoing assembling method of this invention, even though fitting 99 is illustrated herein as being threadedly secured to metallic casing member 27, it is contemplated that other fittings may be secured to other metallic casing members by suitable means, such as for instance welding or the like, within the scope of the invention.

With reference again to the drawings in general and recapitulating at least in part with respect to the foregoing, transducer 21 is provided with a casing 107 having a plurality of walls or wall means 109 for defining chambers 39, 65 in the casing with chamber 39 being adapted for subjection to fluid pressure, and one of the wall means comprises wall 29 interposed between the chambers and including diaphragm 31 for deflection in response to fluid pressure in chamber 39 (FIG. 7). Strain gauge 25 is associated with wall 29 in chamber 65 for conjoint deflection at least in part with diaphragm 31, and electronic device 33 is disposed in superposed spaced apart relation with the strain gauge in chamber 65 (FIGS. 7 and 10). Spring clips 57–57*d* are mounted to strain gauge 25 and electronic device 33 for maintaining the superposed spaced apart relation thereof and for connection in circuit relation with at least one of the strain gauge and the electronic device (FIGS. 3–8). Terminals 69, 71, 73 are mounted in casing 107 for connection in circuit relation with at least one of strain gauge 25 and electronic device 33 (FIGS. 7 and 9–11.).

More particularly and with specific reference to FIG. 7, casing 107 comprises dielectric casing member 23 and metallic casing member 27 with collar 91 arranged, as previously mentioned, in displacement preventing engagement between the dielectric and metallic casing members in their preselected assembly position. Dielectric casing member 23 may be formed of any suitable material having the desired dielectric and physical characteristics, such as for instance a polyester resin available under the trade designation "Valox 420" from the General Electric Company, Fairfield, Conn. It may be noted that chamber 65 in casing 107 accommodates strain gauge 25, electronic device 33, and power connections, such as clips 57–57*d*, contact blades 79, 81, 83 and supporting sections 75 of terminals 69, 71, 73, thereby to be designated an electronic or electrical chamber separate from pressure fluid chamber 39 which, as previously mentioned, is adapted for connection with a fluid pressure source (not shown). If desired, dielectric casing member 23 may be provided with another open ended recess 111 thereby to form a protective socket 113 about electrical connector sections 77 of terminals 69, 71, 73. Albeit not shown for purposes of drawing simplification, a multiple connector of a type well known to the art may be received in socket 113 for connecting electrical connection sections 77 of terminals 69, 71 with line terminals V1, V2 defining a four to fourteen volt DC power source in FIG. 12 and the electrical connector section of terminal 73 with an output voltage receiving terminal V0 for connection with a DC power energized circuit (not shown).

Figure 12:
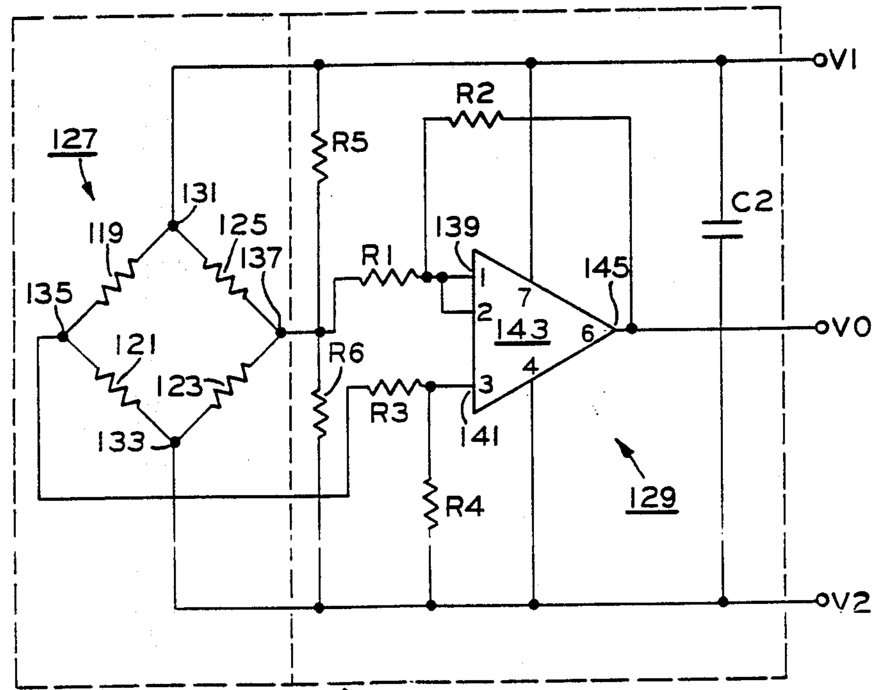
FIG. 12 is a schematic view showing a circuit diagram for the interconnected circuitry of the strain gauge and the electronic device as may be connected across a power source.

As best seen in FIG. 2, connection pads 47–47*c* are generally arcuately arranged in spaced apart relation on carrier 43 of strain gauge 25, and resistance means 49 of the strain gauge comprises generally serpentine extending resistance elements 117 arranged in a plurality of preselected arrays or coils 119, 121, 123, 125 thereof on opposite side 45 of carrier 43. It may be noted that coils 119, 121 of resistance elements 117 are predeterminately arranged in generally trapezoidal configurations and predeterminately disposed adjacent each other generally centrally with respect to diaphragm 31 which has its periphery indicated in dotted outline at 126 in FIG. 2 for coil location reference purposes. Central coil 119 is connected in circuit relation with both connection pads 47, 47*a*, and central coil 121 is connected in circuit relation with both connection pads 47*b*, 47*c*. It may also be noted that coils 123, 125 of resistance elements 117 are predeterminately arranged in generally arcuate configurations and predeterminately disposed generally radially outwardly of central coils 119, 121 adjacent periphery 126 of diaphragm 31. Arcuate coil 123 is connected in circuit relation with both connection pads 47, 47*c*, and arcuate coil 125 is connected in circuit relation with both connection pads 47*a*, 47*b*. Thus the interconnection in circuit relation of coils 119–125 and connection pads 47–47*c*, as discussed above, defines a four active arm strain gauge bridge or bridge circuit 127, as best seen in FIG. 12, and it may be noted that one of coils 119–125 is connected in each arm of bridge 127 for temperature compensation purposes. Connection pads 47–47*c* and coils 119–125 may be formed of any suitable material having the desired electrical and physical characteristics, such as for instance constantine or the like, and may be applied to carrier 43 by any suitable means, such as for instance etching or the like. However, while connection pads 47–47*c* and coils 119–125 are illustrated herein as being etched onto carrier 43 for purposes of disclosure, it is contemplated that the connection pads and coils may be formed directly onto wall 29 and diaphragm 31 by other suitable means, such as for instance sputtering or the like, within the scope of the invention so as to meet at least some of the objects thereof.

Furthermore, even though connection pads 47–47*c* and coils 119–125 of strain gauge 25 are illustrated herein as having predetermined configurations and being predeterminately located with respect to each other and also with respect to diaphragm 31 for purposes of disclosure, it is contemplated that other strain gauges having other connection pads and coils of different configurations and different locations with respect to each other may be utilized within the scope of the invention so as to meet at least some of the objects thereof.

As previously mentioned, diaphragm 31 is an integral generally disc shaped section of wall 29 having a reduced thickness less than that of the rest of the wall, and the diaphragm may have a uniform thickness for example in a range between about 0.0134 and 0.0156 inches and a diameter for example in a range between about 0.374 and 0.376 inches. When diaphragm 31 has the aforementioned thickness and diameter dimensions, it is believed that fluid pressure subjected to chamber 39 to effect deflection of diaphragm 31 may be for example in the range of between about 0 and 500 pounds per square inch. Therefore, in response to the aforementioned fluid pressure in chamber 39 acting on the effective area of diaphragm 31, it may be noted that the deflection of the diaphragm at its center or center point may be for example in a range of between about 0 and 0.001 inches. While the aforementioned thickness, diameter and deflection dimensional ranges of diaphragm 31 and the range of fluid pressure to which it may be subjected are illustrated herein for purposes of disclosure, it is contemplated that other such diaphragms having different thickness, diameter and deflection dimensional ranges and subjected to different ranges of fluid pressure may be utilized within the scope of the invention so as to meet at least some of the objects thereof.

In the operation of transducer 21, assume that the component parts thereof are disposed in their at-rest positions as discussed hereinabove. Thus, when chamber 39 is subjected to fluid pressure from the fluid pressure source (not shown), the fluid pressure acts on the effective area of diaphragm 31 creating a force to effect the deflection of the diaphragm relative to the rest of wall 29 in metallic casing member 27, and in response to this deflection of the diaphragm, the magnitudes of both the radial and tangential strains established at the center of the diaphragm are equal. While he magnitude of the tangential strain decreases from the center of diaphragm 31 to a zero value at peripheral edge 126 thereof, the magnitude of the radial strain decreases rapidly from the center of the diaphragm toward peripheral edge 126 thereof so as to become negative, and at the peripheral edge of the diaphragm the magnitude of the radial strain has a negative value which is about twice that of the magnitude of the radial strain at the center of the diaphragm.

As previously discussed, strain gauge 25 is conjointly deflected with diaphragm 31. Since central coils 119, 121 on strain gauge 25 are predeterminately located generally centrally with respect to diaphragm 31, the central coils are responsive or subjected to the tangential strain established upon the deflection of the diaphragm. To the contrary, since arcuate coils 123, 125 are predeterminately located adjacent peripheral edge 126 of diaphragm 31, the arcuate coils are responsive or subjected to the aforementioned relatively large negative value of the magnitude of the radial strain established in the region of the peripheral edge on the diaphragm upon its deflection. Therefore, because f the aforementioned algebretic sign difference between the established tangential and radial strains respectively sensed by central coils 119, 121 and arcuate coils 123, 125, the bridge circuit 127 incorporating the central and arcuate coils becomes unbalanced thereby to establish an electrical signal or output voltage, as discussed hereinafter. If a more detailed description of the operation of strain gauge 25 in response to the deflection of diaphragm 31, reference may be had to brochure TN-150 of Measurements Group, Inc., Raleigh, N.C. which is incorporated herein by reference.

Referring now to FIG. 12, there is shown a simplified schematic diagram of strain gauge 25 connected in circuit relation with an amplifier circuit, such as for instance an operational amplifier circuit 129 or the like, of electronic device 33 for providing an output voltage at output terminal V0 representative of the conjoint deflection of the strain gauge with diaphragm 31 when chamber 39 of transducer 21 is subjected to fluid pressure, as discussed above. A pair of opposite input terminals 131, 133 in bridge circuit 127 of strain gauge 25 are connected across a D.C. power source, such as for instance line terminals V1, V2 or the like, and a pair of output terminals 135, 137 in the bridge circuit are connected through corresponding ones of resistors R1, R3 to respective inverting and non-inverting input pins 139, 141 (amplifier pin numbers 1 and 3) of an operational amplifier 143, such as for instance an eight pin operational amplifier having a gain of at least fifty thousand and available under model number TSC-911COLA from the Teledyne Corp., Mountain View, Calif. An output pin 145 (amplifier pin number 6) of amplifier 143 is connected to inverting input pin 139 through a feedback resistor R2, and the gain of amplifier circuit 129 is set in a range of from about four hundred to about six hundred by the ratio of the value of resistor R1 to the value of resistor R2. The value of resistor R1 is set equal to the value of resistor R3 in order to improve the common mode rejection or noise rejection of amplifier circuit 129. In addition, non-inverting input pin 141 of amplifier 143 is connected via a resistor R4 to line terminal V2, and the value of resistor R4 is set to the value of resistor R2 so that the output of amplifier circuit 129 is essentially zero with a balanced input from bridge circuit 127. In order to assure balancing of bridge circuit 127, there is provided a voltage divider circuit comprising the serial connection of a pair of resistors R5, R6 connected between line terminals V1, V2 with the junction between intermediate resistors R5, R6 connected to output terminal 137 of bridge circuit 127. As can be seen, resistor R5 is essentially in parallel with coil 125 of bridge circuit 127, and resistor R6 is essentially in parallel with coil 123 of the bridge circuit. By adjusting the relative value of resistors R5, R6, the voltage output of bridge circuit 127 may be balanced to provide a zero differential voltage to amplifier 143 when strain gauge 25 and diaphragm 33 are in the at-rest positions thereof, i.e. not deflected, as previously discussed. While bridge circuit 127 is discussed herein as being balanced so as to provide a zero differential voltage to amplifier 143, it is contemplated that the resistors R5, R6 may be adjusted to effect an unbalanced condition of the bridge circuit when the fluid pressure acting on diaphragm 33 is at zero psi thereby to provide an output voltage greater than zero to the amplifier within the scope of the invention so as to meet at least some of the objects thereof. A capacitor C2 is preferably connected across line terminals V1, V2 to provide filtering and noise suppression for amplifier circuit 129. Thus, it is apparent that when bridge circuit 127 becomes unbalanced in response to the conjoint deflection of strain gauge 25 with diaphragms 31, the unbalanced bridge circuit establishes its aforementioned electrical signal or voltage output which is amplified by operational amplifier 143 in amplifier circuit 129 and transmitted to output terminal V0 for controlling the operation of another device (not shown) associated therewith.

To complete the description and operation of transducer 21, capacitor C2 of circuit 129 in FIG. 12 typically may be a 0.1 microfarad capacitor, and typical ohmic values of the resistors in the circuit are as follows: R1, R3 each may be 1K ohms; R2, R4 each may be layer trimmed to a range of about 500K to 650K ohms; R5 may be 300K ohms; and R6 may be layer trimmed to a range of about 300K to 500K ohms. However, it is contemplated that different numbers of capacitors and resistors having different electrical values may be utilized in circuit 129 and arranged therein in different circuit configurations within the scope of the invention so as to meet at least some of the objects thereof.

From the foregoing, it is now apparent that an improved method of assembling an electronic transducer is presented meeting at least the objects set out hereinbefore, and it is contemplated that changes as to the precise arrangements, shapes, details and connections of the components disclosed herein, as well as the precise order of the assembling method steps disclosed herein, may be made by those having ordinary skill in the art without departing either from the spirit of the invention or from the scope of the invention as set out in the claims which follow.

What we claim as new and desire to secure by Letters Patents of the United States is:

1. A method of assembling an electronic transducer having a collar with a flange thereon, a strain gauge having a flexible dielectric carrier, a dielectric casing member including at least one recess therein, and a set of terminals mounted to the dielectric casing member with each terminal having a supporting section within the at least one recess and an electrical connector section exteriorly thereof, a metallic casing member including at least one end face, a recess means for subjection to fluid pressure and defining with the at least one end face a flexible diaphragm therebetween adapted to be deflected upon the subjection of the recess means to fluid pressure, an electronic device having a plurality of solid state components associated in circuit relation, a set of electrical connector clips, and a set of contact blades, the method comprising the steps of:

adhering the carrier of the strain gauge to the at least one end face of the metallic casing member so that the strain gauge spans at least in part across the diaphragm so as to be conjointly flexible therewith;

securing the electrical connector clips in preselected locations on the electronic device in circuit relation therewith;

connecting at least some of the electrical connector clips in circuit relation to the strain gauge;

disposing the electronic device in spaced apart relation adjacent the carrier with the solid state components being remote from the carrier during the connecting step;

mounting the contact blades to the supporting sections of the terminals with the contact blades extending in preselected locations from the supporting sections, respectively;

associating the dielectric casing member and the metallic casing member in a preselected assembly position with respect to each other so as to enclose the strain gauge, the electronic device, the contact blades, the electrical connector clips and the supporting sections of the terminals within the recess means of the dielectric component;

arranging the contact blades in circuit relation with respective ones of the electrical connector clips connected in circuit relation with at least the electronic device during the associating step;

placing the collar in part about the metallic casing member and the dielectric casing member with the flange on the collar being engaged with one of the dielectric casing member and the metallic casing member when the metallic casing member and the dielectric casing member are in the preselected assembly position thereof; and deforming a part of the collar into displacement preventing engagement with the other of the dielectric casing member and the metallic casing member thereby to return the metallic and dielectric casing members in the preselected assembly position thereof.

2. The method as set forth in claim 1 wherein the carrier has a pair of generally opposite sides with resistance elements formed in preselected arrays thereof on one of the opposite sides and wherein the adhering step includes bonding the other of the opposite sides to the at least one end face and predeterminately locating the resistance elements so as to span only a part of the diaphragm.

3. The method as set forth in claim 2 wherein the electronic device includes a substrate having a pair of generally opposite sides with the solid state components mounted in the circuit relation thereof on one of the opposite sides and wherein the disposing step includes spacing the other of the opposite sides of the substrate adjacent the one side of the carrier.

4. The method as set forth in claim 1 wherein the connecting step includes placing a conductive adhering material between the at least some electrical connector clips and the strain gauge and heating at least the conductive adhering material to solidify it in circuit making and displacement preventing engagement between the at least some electrical connector clips and the strain gauge.

5. The method as set forth in claim 1 wherein the contact blades each have a pair of end portions with an opening in one of the end portions and wherein the mounting step includes inserting the supporting sections of the terminals into circuit making engagement with the contact blades within the openings in the one end portion thereof.

6. The method as set forth in claim 5 wherein the arranging step includes placing a conductive adhering material between the other of the end portions of the contact blades and the respective ones of the electrical connector clips, and heating at least the conductive adhering material to solidify it in circuit making and displacement preventing engagement between the respective ones of the electrical connector clips and the other end portions of the contact blades, respectively.

7. A method of assembling an electronic transducer having a dielectric casing member including an integral flexible diaphragm, and an electronic device including a plurality of solid state components connected in circuit relation, the method comprising the steps of:

positioning the strain gauge on the metallic casing member with the strain gauge spanning at least in part across the diaphragm so as to be at least in part conjointly flexible with the diaphragm;

disposing the electronic device on the strain gauge with the solid state components of the electronic device being in superposed spaced apart relation with the strain gauge and connecting the electronic device in circuit making relation with the strain gauge; and enclosing the strain gauge and the electronic device between the dielectric and metallic casing members.

8. The method as set forth in claim 7 wherein the strain gauge includes a flexible dielectric carrier and wherein the positioning step includes adhering the carrier to the metallic casing member.

9. The method as set forth in claim 7 wherein the electronic transducer further has a plurality of electrical connector clips and wherein the disposing step includes securing the electrical connector clips in circuit making relation with the electronic device and interconnecting at least some of the electrical connector clips in circuit making relation with the strain gauge to effect the connecting step.

10. The method as set forth in claim 9 wherein the dielectric casing member includes at least one recess therein and wherein the enclosing step includes arranging the dielectric casing member and the metallic casing member in a preselected assembly position with respect to each other and receiving at least the strain gauge, the electronic device and the electrical connector clips within the at least one recess.

11. The method as set forth in claim 7 wherein the electronic transducer also has a collar and wherein the method further comprises the additional step of deforming the collar at least in part into displacement preventing engagement with at least one of the metallic casing member and dielectric casing member and retaining thereby the metallic and dielectric casing members in the preselected assembly position thereof.

12. The method as set forth in claim 7 wherein the dielectric casing further includes a plurality of terminals and wherein the enclosing step includes interconnecting the terminals in circuit relation with at least the electronic device.

13. The method as set forth in claim 7 wherein the disposing step includes facing the solid state components of the electronic device away from the strain gauge.

14. The method as set forth in claim 7 wherein the electronic transducer also has a fitting with a pressure fluid passage therethrough and wherein the method further comprises the additional step of engaging the fitting and the metallic casing member with the diaphragm being communicated with the pressure fluid passage.

15. A method of assembling an electronic transducer, the electronic transducer including a dielectric casing member having a set of terminals each with a supporting section and an electrical connector section, a metallic casing member having an integral flexible diaphragm, an electronic device, a strain gauge, and a set of contact blades each having a pair of end portions, the method comprising the steps of:

supporting one of the end portions of the contact blades on the supporting sections of the terminals in circuit making engagement therewith, respectively;

positioning the strain gauge on the metallic casing member so as to span at least in part across the diaphragm for conjoint flexure therewith;

disposing the electronic device in superposed spaced apart relation and in circuit making relation with the strain gauge; and connecting the other of the end portions on the contact blades in circuit relation with the electronic device and arranging the dielectric casing member and the metallic casing member in a preselected assembly position thereby to enclose at least the strain gauge, the electronic device, the contact blades and the supporting sections of the terminals between the dielectric casing member and the metallic casing member in the preselected assembly position thereof.

16. The method as set forth in claim 15 wherein the electronic device includes a substrate having a pair of opposite sides, and a plurality of solid state components connected in circuit relation on one of the opposite sides, and wherein the disposing step includes arranging the other of the opposite sides of the substrate adjacent the strain gauge.

17. The method as set forth in claim 15 wherein each contact blade further includes an opening in the one end portion thereof and wherein the supporting step includes mounting a part of the supporting sections in the openings in circuit making relation with the contact blades and extending the contact blades in preselected located positions from the supporting sections, respectively.

18. The method as set forth in claim 15 wherein the dielectric casing member further includes at least one recess therein, the supporting sections being within the at least one recess and the electrical connector sections being exteriorly thereof, and wherein the arranging step includes enclosing at least the strain gauge, the electronic device, the contact blades and the supporting sections within the at least one recess means.

19. The method as set forth in claim 15 wherein the electronic transducer further has a collar and wherein the method further comprises the additional step of associating the collar with the dielectric casing member and the metallic casing member and deforming the collar at least in part into displacement preventing engagement with at least one of the dielectric and metallic casing members thereby to retain the dielectric and metallic casing members in the preselected assembly position thereof.

20. The method as set forth in claim 15 wherein the electronic transducer further has a fitting with passage means therethrough for a pressure fluid and wherein the method further comprises the additional step of sealably engaging the fitting with the metallic casing member and communicating the passage means in the fitting with the diaphragm.

21. A method of assembling an electronic transducer including an electronic device, a dielectric casing member, and a metallic casing member having at least one end face defining in part a flexible diaphragm integral with the metallic casing member, the method comprising the steps of:

providing a strain gauge having at least a set of resistance elements arranged in preselected arrays thereof on the at least one end face of the metallic casing member and locating the preselected arrays of the resistance elements at least in part on the diaphragm so as to be conjointly flexible therewith;

disposing the electronic device in a preselected position on the strain gauge with a part of the electronic device being spaced from the strain gauge and connecting the electronic device in circuit making relation with at least some of the preselected arrays of the resistance elements of the strain gauge; and enclosing at least the strain gauge and the electronic device between the dielectric and metallic casing members.

22. The method as set forth in claim 21 wherein the providing step includes forming the strain gauge in place directly on the at least one end face of the metallic casing member.

23. The method as set forth in claim 22 wherein the providing step includes sputtering a flexible resistance material in place directly on the end face thereby to define the strain gauge.

24. The method as set forth in claim 23 wherein the material is constantine.

25. The method as set forth in claim 21 wherein the providing step includes adhering to the at lest one end face a flexible carrier with the preselected arrays of the resistance elements being arranged on the flexible carrier thereby to define at least in part the strain gauge.

* * * * *